US009049661B2

(12) United States Patent
Klingenbrunn et al.

(10) Patent No.: US 9,049,661 B2
(45) Date of Patent: Jun. 2, 2015

(54) METHODS AND APPARATUS TO REDUCE POWER CONSUMPTION FOR HARQ DECODING

(75) Inventors: Thomas Klingenbrunn, San Diego, CA (US); Brian Clarke Banister, San Diego, CA (US); Navid Ehsan, San Diego, CA (US); Levent Aydin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 13/613,826

(22) Filed: Sep. 13, 2012

(65) Prior Publication Data
US 2013/0064153 A1    Mar. 14, 2013

Related U.S. Application Data

(60) Provisional application No. 61/534,809, filed on Sep. 14, 2011.

(51) Int. Cl.
G08C 17/00 (2006.01)
H04W 52/02 (2009.01)

(52) U.S. Cl.
CPC ............ *H04W 52/0229* (2013.01); *Y02B 60/50* (2013.01)

(58) Field of Classification Search
USPC .................. 455/574; 370/310, 311, 329, 341; 714/748, 762
See application file for complete search history.

(56) References Cited

U.S. PATENT DOCUMENTS

| 8,031,643 | B2 * | 10/2011 | Kwak et al. ................... 370/278 |
| 8,448,036 | B2 * | 5/2013 | Cai et al. ........................ 714/748 |
| 8,522,103 | B2 * | 8/2013 | Kim et al. ..................... 714/748 |
| 8,625,703 | B2 * | 1/2014 | Ko et al. ........................ 375/284 |
| 8,750,228 | B2 * | 6/2014 | Aiba et al. ..................... 370/329 |
| 8,798,031 | B2 * | 8/2014 | Ishii .............................. 370/350 |
| 2007/0254679 | A1 | 11/2007 | Montojo et al. |
| 2008/0004008 | A1 | 1/2008 | Nicol et al. |
| 2008/0186892 | A1 | 8/2008 | Damnjanovic |
| 2009/0239566 | A1 * | 9/2009 | Pelletier et al. ............... 455/517 |
| 2010/0097978 | A1 | 4/2010 | Palanki et al. |
| 2010/0208660 | A1 | 8/2010 | Ji |
| 2010/0246463 | A1 | 9/2010 | Papasakellariou et al. |
| 2010/0272035 | A1 * | 10/2010 | Park et al. ...................... 370/329 |
| 2011/0053657 | A1 * | 3/2011 | JI .................................. 455/574 |
| 2011/0200020 | A1 | 8/2011 | Xu et al. |
| 2013/0058315 | A1 * | 3/2013 | Feuersanger et al. ......... 370/336 |
| 2013/0107835 | A1 * | 5/2013 | Aiba et al. ..................... 370/329 |

FOREIGN PATENT DOCUMENTS

| WO | 2005071875 A1 | 8/2005 |
| WO | 2006019625 A2 | 2/2006 |
| WO | 2010021580 A1 | 2/2010 |
| WO | 2010146625 A1 | 12/2010 |

OTHER PUBLICATIONS

International Search Report and Written Opinion—PCT/US2012/055272—ISA/EPO—Dec. 20, 2012.

* cited by examiner

*Primary Examiner* — Phuc Tran
(74) *Attorney, Agent, or Firm* — Patterson & Sheridan, L.L.P.

(57) ABSTRACT

Certain aspects of the present disclosure may help reduce power consumption by allowing a UE to remain in a low power state by not attempting to decode ACK/NACK transmissions after receiving a positive acknowledgement (ACK).

30 Claims, 8 Drawing Sheets

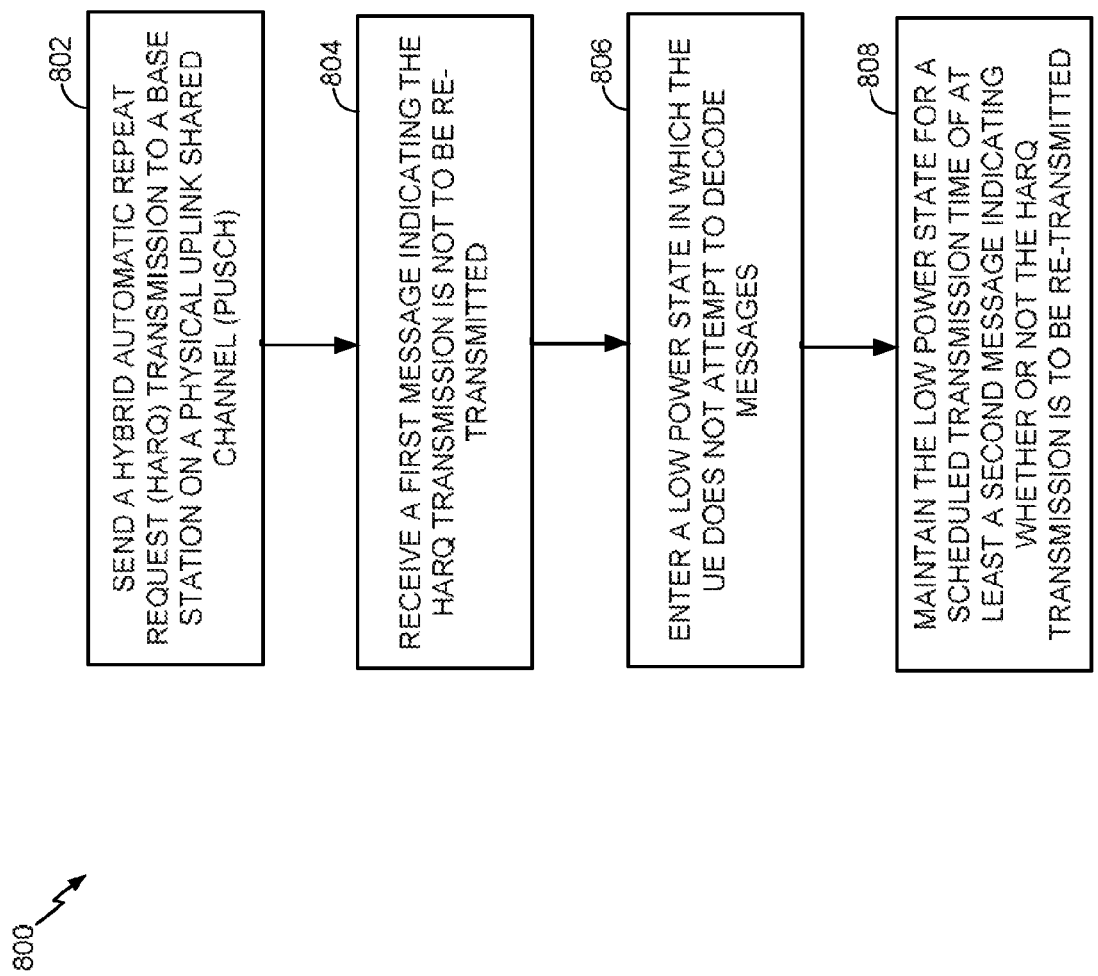

METHODS AND APPARATUS TO REDUCE POWER CONSUMPTION FOR HARQ DECODING

CLAIM OF PRIORITY UNDER 35 U.S.C. §119

The present Application for Patent claims benefit of U.S. Provisional Patent Application Ser. No. 61/534,809, filed Sep. 14, 2011 and assigned to the assignee hereof and hereby expressly incorporated by reference herein.

FIELD

Certain embodiments of the present disclosure generally relate to wireless communications and, more particularly, to methods and apparatus for reducing power consumption.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may be configured to re-send an uplink transmission until it receives a positive acknowledgement (ACK) that the uplink transmission was successfully received by a base station. In some cases, even after a UE has received an ACK, it may still be expected to keep decoding a control channel (e.g., a PHICH or PDCCH). This is because even if the base station did not successfully receive the UL transmission, it may use an ACK to suspend the retransmission, for example, to grant resources for transmissions that may be higher priority at that instant. Without continued decoding of the control channel, a subsequent grant for re-transmission would not be detected so there would be no re-transmission, which would result in a packet drop. In addition, this approach allows eventual retransmission in the event a negative acknowledgement (NACK) was transmitted, but somehow interpreted as an ACK.

Unfortunately, continued decoding of an acknowledgement channel may limit the amount of time a UE stays in a low power state, which may lead to unnecessary power consumption.

SUMMARY

In an aspect of the disclosure, a method for wireless communications by a user equipment (UE) is provided. The method generally includes sending a Hybrid Automatic Repeat reQuest (HARQ) transmission to a base station on a physical uplink shared channel (PUSCH), receiving a first message indicating the HARQ transmission is not to be re-transmitted, entering a low power state in which the UE does not attempt to decode messages, and maintaining the low power state for a scheduled transmission time of at least a second message indicating whether or not the HARQ transmission is to be re-transmitted.

In an aspect of the disclosure, an apparatus for wireless communications by a UE is provided. The apparatus generally includes means for sending a Hybrid Automatic Repeat reQuest (HARQ) transmission to a base station on a physical uplink shared channel (PUSCH), means for receiving a first message indicating the HARQ transmission is not to be re-transmitted, means for entering a low power state in which the UE does not attempt to decode messages, and means for maintaining the low power state for a scheduled transmission time of at least a second message indicating whether or not the HARQ transmission is to be re-transmitted.

In an aspect of the disclosure, an apparatus for wireless communications by a UE is provided. The apparatus generally includes at least one processor and a memory coupled to the at least one processor. The at least one processor is generally configured to send a Hybrid Automatic Repeat reQuest (HARQ) transmission to a base station on a physical uplink shared channel (PUSCH), receive a first message indicating the HARQ transmission is not to be re-transmitted, enter a low power state in which the UE does not attempt to decode messages, and maintain the low power state for a scheduled transmission time of at least a second message indicating whether or not the HARQ transmission is to be re-transmitted.

In an aspect of the disclosure, a computer-program product for wireless communications by a UE is provided that comprises a computer-readable medium having instructions stored thereon. The instructions are generally executable by one or more processors for sending a Hybrid Automatic Repeat reQuest (HARQ) transmission to a base station on a physical uplink shared channel (PUSCH), receiving a first message indicating the HARQ transmission is not to be re-transmitted, entering a low power state in which the UE does not attempt to decode messages, and maintaining the low power state for a scheduled transmission time of at least a second message indicating whether or not the HARQ transmission is to be re-transmitted.

BRIEF DESCRIPTION OF THE DRAWINGS

FIG. 8 illustrates example operations, in accordance with certain aspects of the present disclosure.

DETAILED DESCRIPTION

Figure 1:
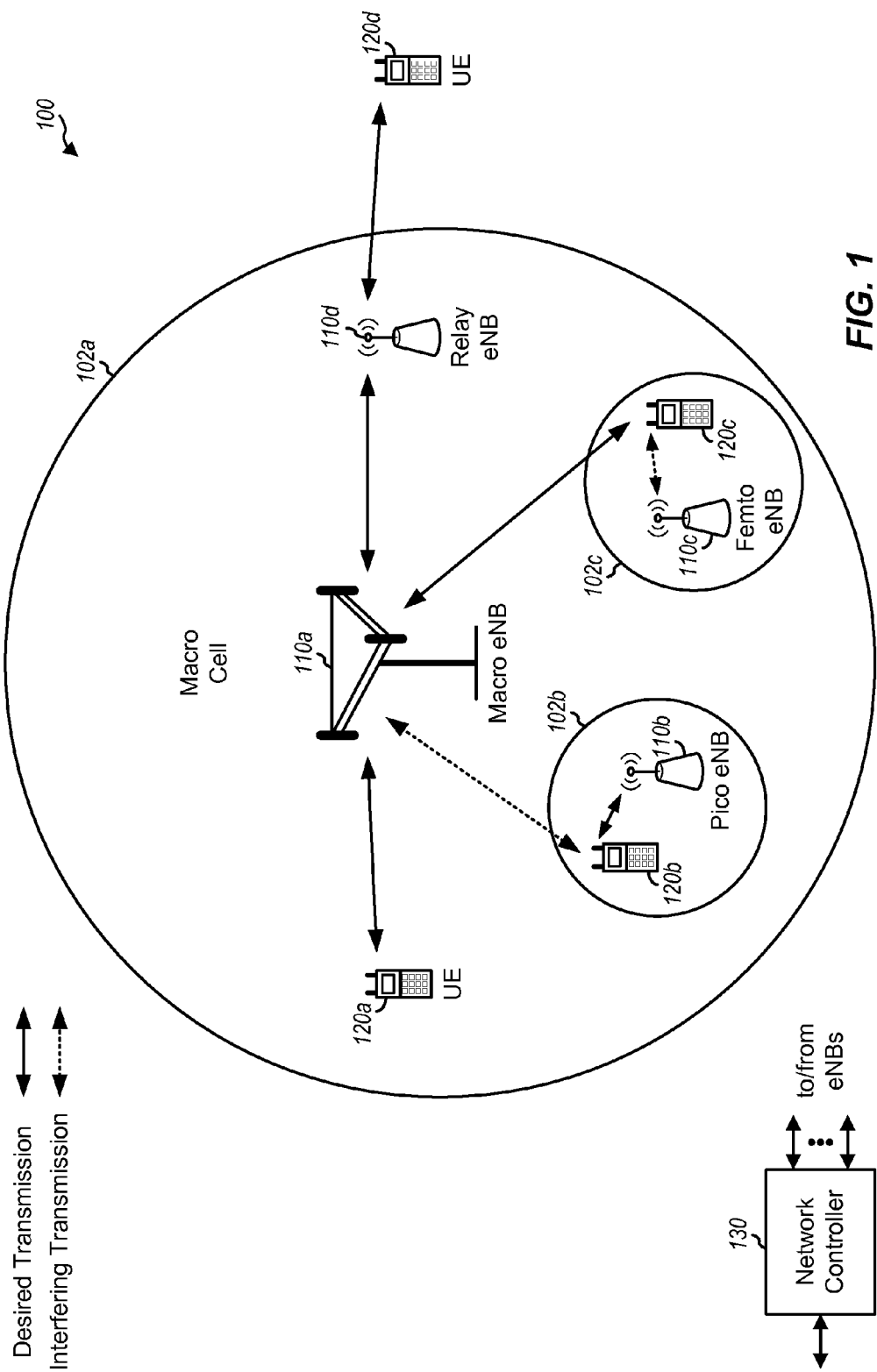
FIG. 1 is a block diagram conceptually illustrating an example of a wireless communications network in accordance with certain aspects of the present disclosure.

As described above, in certain scenarios, a UE may be expected to continue decoding an acknowledgement channel even after the UE has received a positive acknowledgement (ACK) that a base station successfully received the a UL transmission. This continued decoding may be desirable for various reasons. For example, this continued decoding may allow the UE to detect a subsequent NACK in the event the positive ACK was actually received in error (e.g., due to a NACK to ACK conversion during transmission), allowing the UE to retransmit and avoiding UL packet loss. As another example, the continued decoding may allow the use of an ACK to suspend retransmissions, even if the base station did not successfully receive the UL transmission.

Unfortunately, such continued decoding of the acknowledgement channel may substantially limit the amount of time the UE stays in a low power state. In other words, the UE has to prematurely exit the low power state to decode the acknowledgement channel, leading to increased power consumption.

Certain aspects of the present disclosure, however, provide techniques for a UE to increase the amount of time it stays in a low power state. As will be described in greater detail below, the UE may stay in the low power state and ignore (e.g., not attempt to decode) an acknowledgement channel for a transmission time (e.g., one or more transmission time intervals (TTIs)) after receiving an ACK. After ignoring the ACK channel for one or more TTIs, the UE may subsequently exit low power state and still decode the ACK channel in time to re-transmit a packet and avoid packet loss.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 shows a wireless communication network 100 in which procedures described for performing reference signal processing utilizing resource partitioning information may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 120a, an eNB 110b may be a pico eNB for a pico cell 120b, and an eNB 110c may be a femto eNB for a femto cell 120c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
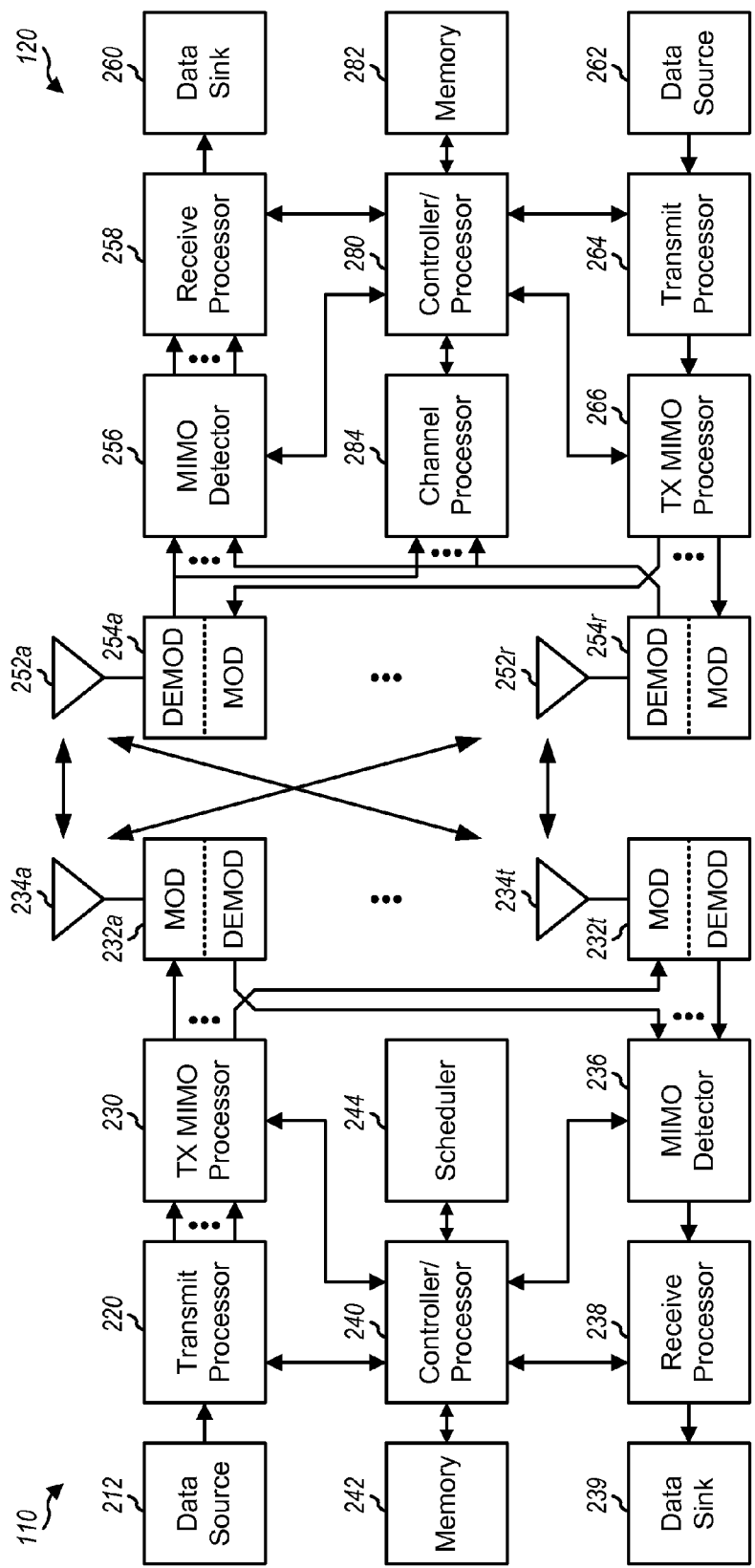
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., CQI requests, grants, upper layer signaling, etc.) and provide overhead symbols and control symbols. Processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine reference signal received power (RSRP), received signal strength indicator (RSSI), reference signal received quality (RSRQ), CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Figure 3:
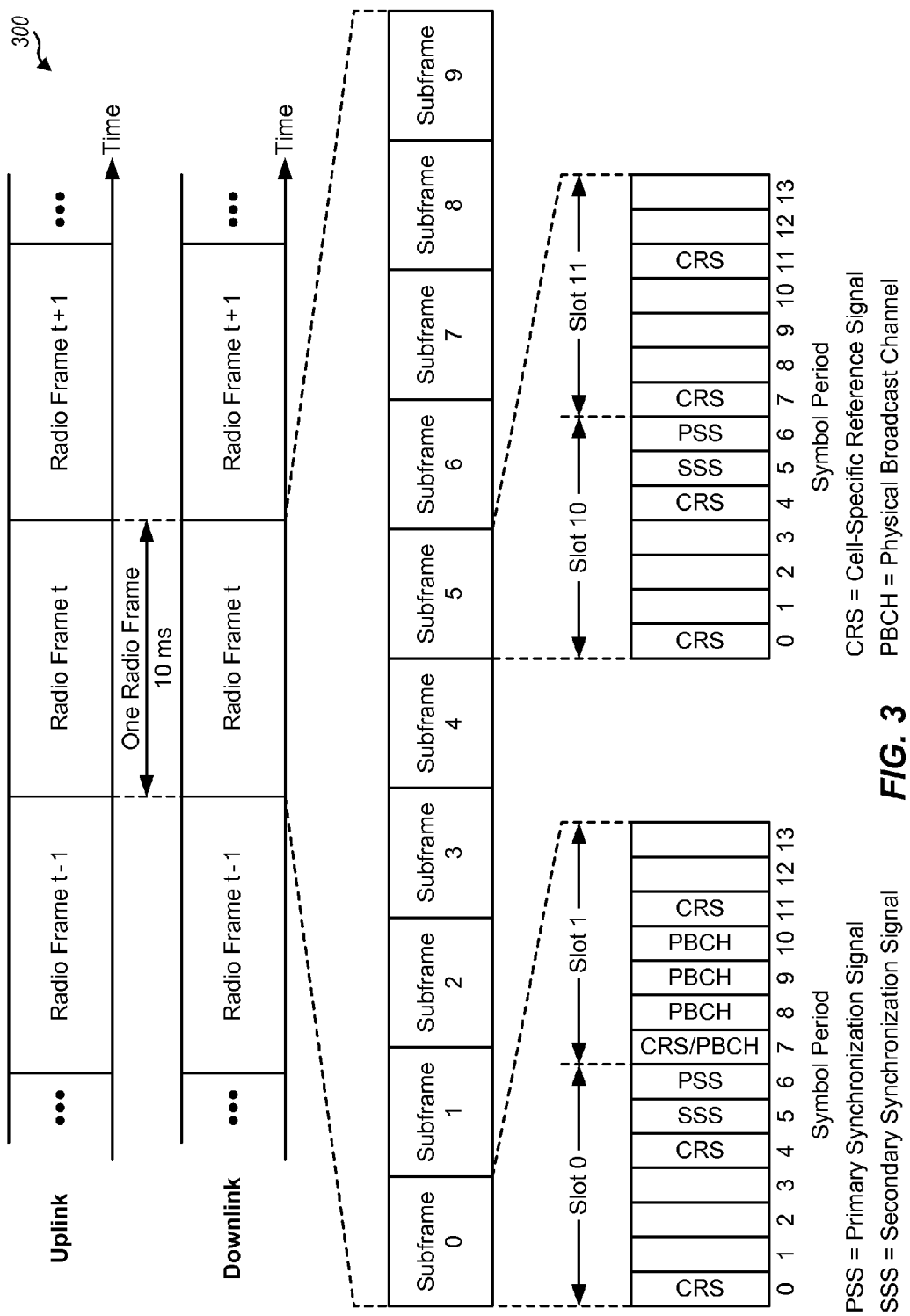
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

Reducing Power Consumption for HARQ Decoding During HARQ Suspend and NACK to ACK Conversion As noted above, in scenarios when a UE may be expected to continue decoding an acknowledgement channel (e.g., Physical Hybrid ARQ Indicator CHannel (PHICH) or Physical Downlink Control CHannel (PDCCH)), even after the UE has received an ACK for an uplink transmission, the continued decoding may result in increased power consumption.

Without continued decoding of the acknowledgement channel, however, a subsequent NACK (sent after the suspend ACK) would not be detected so there would be no re-transmission, which would result in a packet drop. In addition, in some cases a transmitted NACK may be erroneously interpreted as an ACK (referred to herein as a NACK to ACK conversion). Continued decoding of the acknowledgement channel may allow a subsequent NACK (not converted to ACK) to be decoded and eventual retransmission, avoiding packet drop.

Aspects of the present disclosure, however, may allow for the benefits of continued ACK channel decoding, but in a manner that allows for reduced power consumption. As will be described in greater detail below, according to certain aspects, a UE may be able to stay in a low power state longer by ignoring one or more ACK channel transmit time intervals (TTIs).

Figure 4:
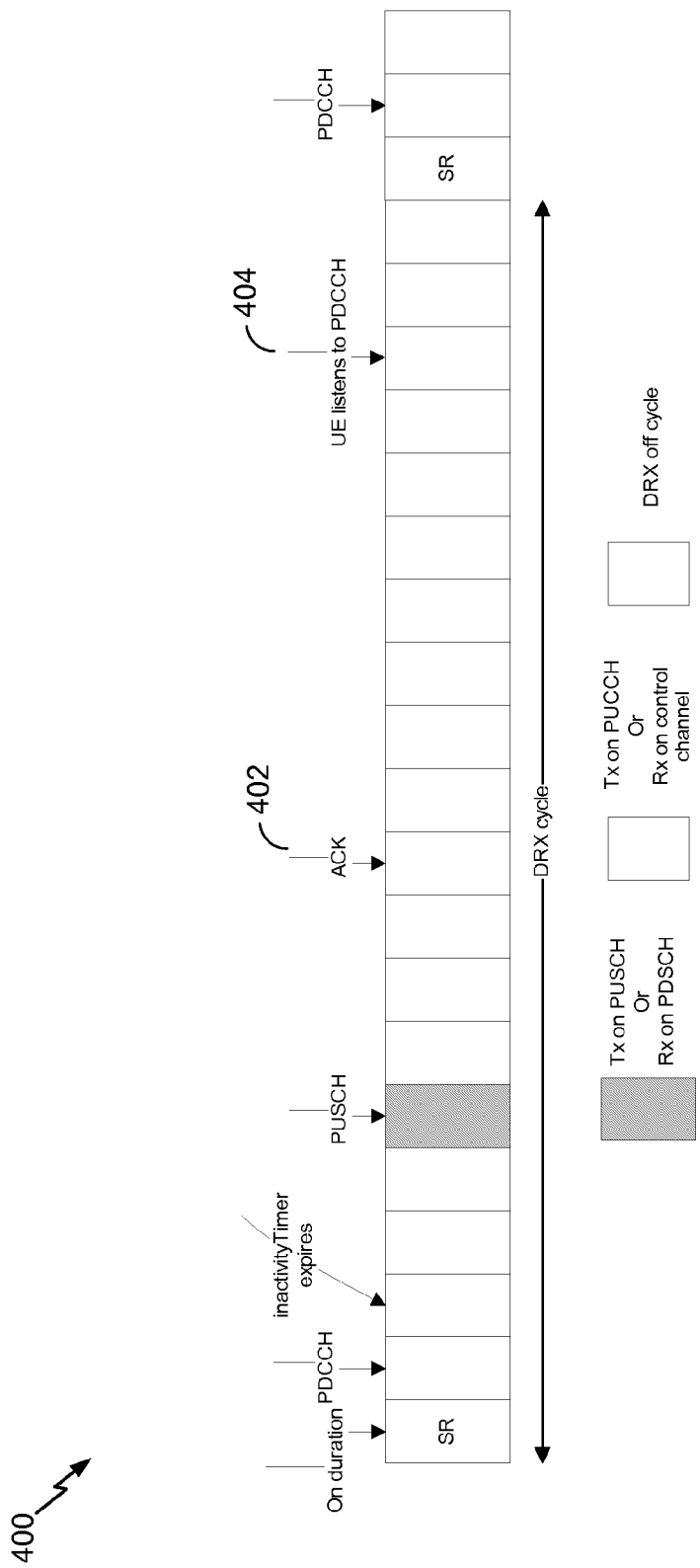
FIG. 4 illustrates an example exchange of messages.

FIG. 4 illustrates an example timeline 400 of subframes for continued decoding of an acknowledgement channel. The example scenario assumes data is transmitted with a relatively low duty cycle, such as 20 ms periodicity (20×1 ms subframes), as occurs with voice over IP (VoIP). As illustrated, during a Discontinuous Reception (DRX) cycle, the UE may periodically switch off its receiver to reduce power consumption. DRX cycles may be configured in the LTE downlink so that the UE does not have to decode the Physical Downlink Control CHannel (PDCCH) or receive Physical Downlink Shared Channel (PDSCH) transmissions in certain subframes.

In this example, the UE wakes up, at 402, to decode an acknowledgement (ACK) indicating successful receipt of a previous uplink transmission on PUSCH. After receiving the ACK, which may be sent in a Physical Hybrid ARQ Indicator CHannel (PHICH), the UE may again power down its receiver. As noted above, however, the UE may again power up at 404 to listen for (decode) an acknowledgement channel (e.g., for an uplink grant message in PDCCH). Thus, in this example, the UE awakens every 8 ms to check for an ACK and is, thus, limited to being in the low power state for 7 ms (the period between receiving the ACK and awaking to decode PDCCH to check for a subsequent ACK).

Such continued decoding of an acknowledgement channel may limit the amount of time a UE stays in a low power state and lead to unnecessary power consumption. However, techniques presented herein may allow a UE to remain in a low power state longer by not attempting to decode (essentially "ignoring") an acknowledgement channel for one or more TTIs after receiving an ACK for an uplink transmission.

Figure 5:
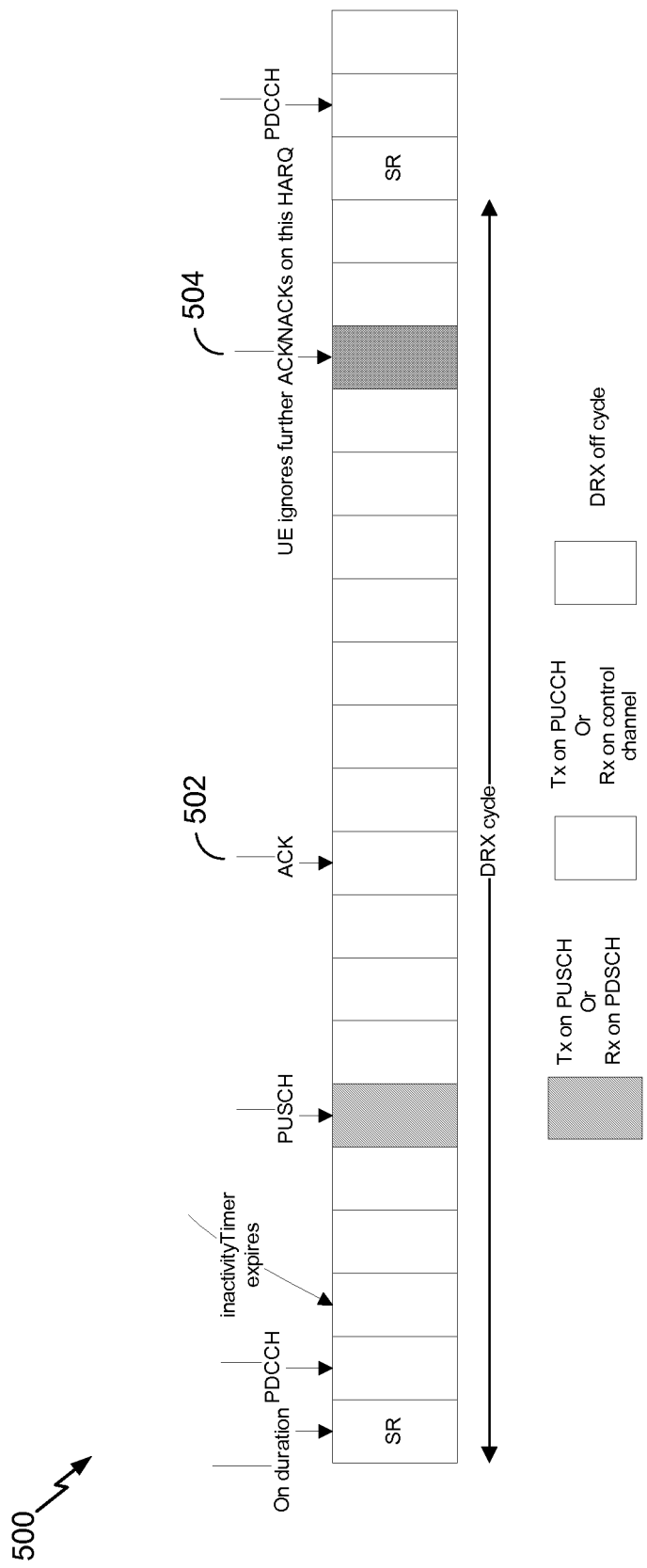
FIG. 5 illustrates an example exchange of messages, in accordance with aspects of the present disclosure.

FIG. 5 illustrates an example scenario in which a UE does not attempt to decode an acknowledgement channel for one or more TTIs after receiving an ACK for an uplink transmission. As illustrated, after receiving a first ACK at 502, the UE essentially ignores subsequent ACK/NAKs at 504 and may, thus remain in a low power state longer, which may help reduce power consumption.

As noted above, if the UE ignores all subsequent ACKs, a corresponding packet may be dropped, for example, in the event the first ACK, at 502, was actually a NACK to ACK conversion. For most applications, such as VoIP, this may be acceptable as NACK to ACK conversion probability may be relatively low. Similarly, a suspend ACK (where a base station sends an ACK to suspend retransmission even though UL data was not successfully received) may also result in a packet being dropped.

In high load scenarios, suspend ACKs may be used relatively frequently and resultant packet loss may be an issue if a UE ignores the ACK channel in all subsequent TTIs. According to certain aspects, however, a UE may only ignore ACK/NACKs for a predetermined amount of time (or number of TTIs), but wake up at a later point and again decode the ACK channel. If the ACK was a suspend ACK, then an eNB would have likely scheduled a NACK by that time, which the UE will then detect.

Figure 6:
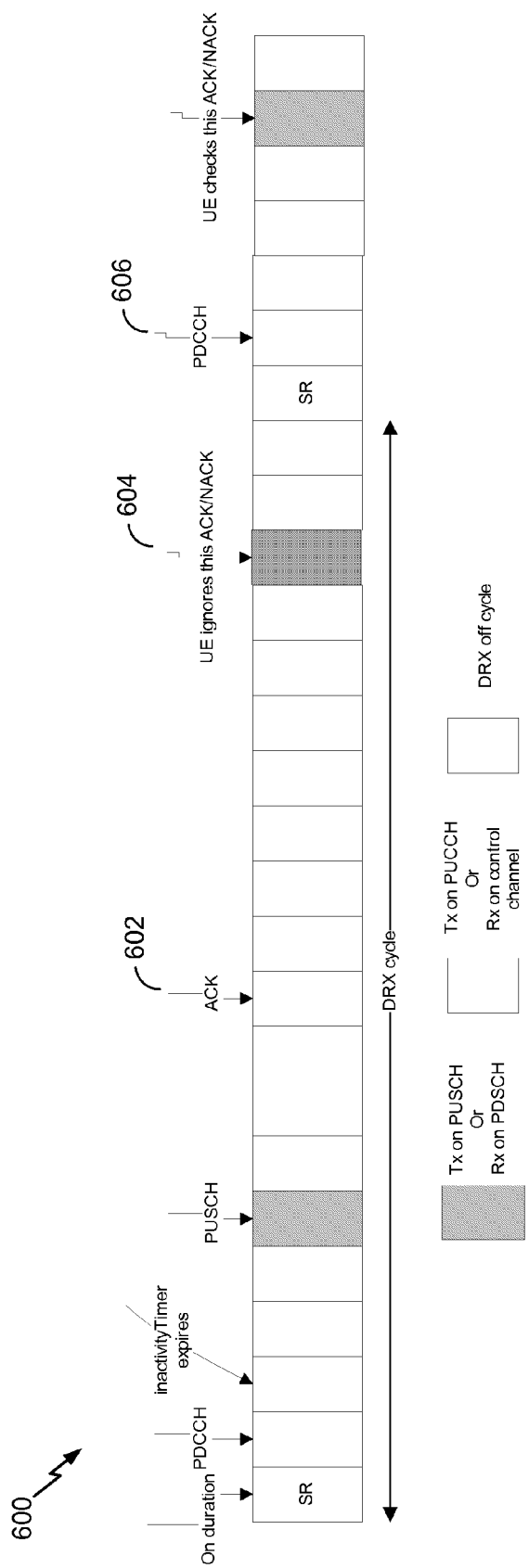
FIG. 6 illustrates an example exchange of messages, in accordance with aspects of the present disclosure.

FIG. 6 illustrates an example scenario in which a UE does not attempt to decode an acknowledgement channel for one or more TTIs after receiving an ACK, at 502, for an uplink transmission. As illustrated, the UE may essentially ignore one or more subsequent ACK/NAKs, at 604, but awaken at a later time to decode to check for a subsequent ACK/NACK, at 606.

According to certain aspects, the timing of this subsequent decoding (ACK check) may be aligned with a subsequent PUSCH transmission. In other words, as the UE may be scheduled to power up anyway for the PUSCH transmission, no additional power may be used for this additional check (e.g., corresponding to a 20 ms periodicity). Consequently, the UE may remain in the low power state for a large portion (e.g., 15 ms) of such periodicity.

According to certain aspects, the UE may decide (or be configured) to always ignore suspend ACKs. As an alternative, the UE may implement a hybrid scheme, where some type of logic determines whether the network is going to use suspend ACK. For example, this determination may be based on one or more network parameters, estimating network loading (where suspend ACK is more likely), or it could be determined based on an algorithm which occasionally checks for use of a suspend ACK (e.g., as determined implicitly by detecting a NACK following an ACK).

As an alternative or in addition, the network may explicitly or implicitly inform the UE about the use of suspend ACK. In this case, a UE may be configured to ignore one or more subsequent ACK/NACKs if it determines suspend ACKs are not likely to be used.

Figure 7:
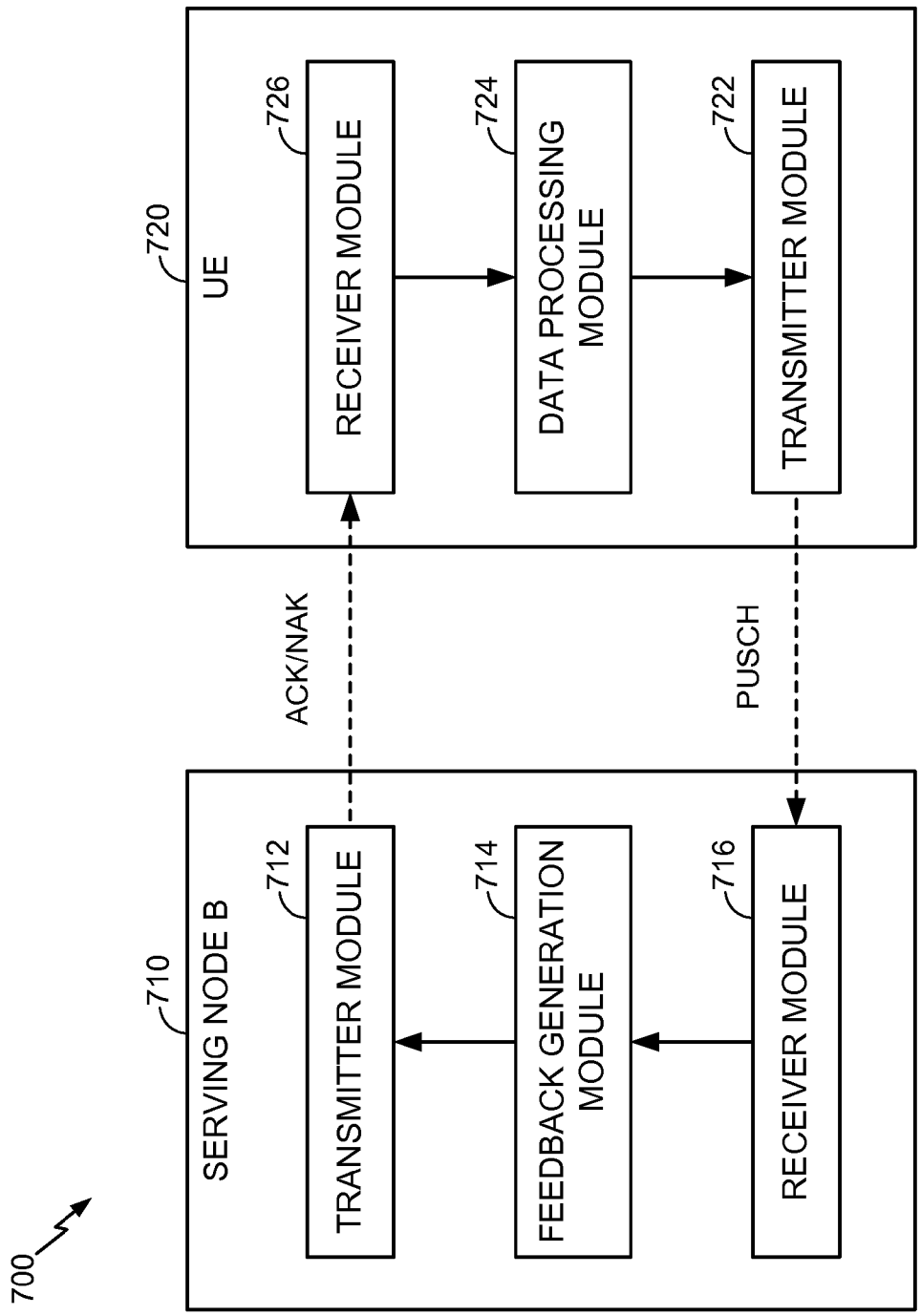
FIG. 7 illustrates an example system with a Node B and a UE, capable of performing operations, in accordance with certain aspects of the present disclosure.

Whether or not a UE ignores subsequent ACKs may also be dependent on a type of data transmission. For example, for relatively low data rate sessions, such as VoIP, ignoring ACKs may result in substantial power savings an acceptable amount of packet loss. Further, by eventually decoding after some period of time, as described above with reference to FIG. 6, suspend ACKs and/or NACK to ACK conversions may be handled with little performance penalty. According to certain aspects, a UE may receive an indication that the first message corresponds to a suspend acknowledgement message transmitted to suspend re-transmission of the HARQ transmission even if the HARQ transmission was not successfully received. In some cases, a duration for which the low power state is maintained may be dependent on how often messages indicating a HARQ transmission is not to be re-transmitted do not correspond to successfully received HARQ transmissions FIG. 7 illustrates an example system 700 with a serving Node B 710 and a user equipment (UE) 720, capable of performing the operations described above. The UE 720 may generate uplink transmissions, via a data processing module 724 and send the uplink transmissions, via a transmitter module 722, on a PUSCH.

As illustrated, the serving Node B 710 may receive such transmissions via a receiver module 718. The Node B 710 may also include a feedback generation module 714 for generating ACK/NACK indications. As noted above, the ACK/NACKs may be transmitted, via a transmitter module 712, on PHICH or PDCCH. The UE 720 may receive the ACK/NACK via a receiver module 726 and the data processing module 724 may determine if an ACK is received and the UE 720 may act accordingly (e.g., ignoring one or more subsequent ACK/NACK TTIs as discussed above.

FIG. 8 illustrates example operations 800 for performing HARQ processing, in accordance with certain aspects of the present disclosure. The operations 800 may be performed, for example, by a UE.

At 802, the UE may send a Hybrid Automatic Repeat reQuest (HARQ) transmission to a base station on a physical uplink shared channel (PUSCH). At 804, the UE may receive a first message indicating the HARQ transmission is not to be re-transmitted.

At 806, the UE may enter a low power state in which the UE does not attempt to decode messages. At 808, the UE may maintain the low power state for a scheduled transmission time interval (TTI) of at least a second message indicating whether or not the HARQ transmission is to be re-transmitted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    sending a Hybrid Automatic Repeat reQuest (HARQ) transmission to a base station on a physical uplink shared channel (PUSCH);
    receiving a first message indicating the HARQ transmission is not to be re-transmitted;
    entering a low power state in which the UE does not attempt to decode an acknowledgement channel; and
    maintaining the low power state for a scheduled transmission time of at least a second message indicating whether or not the HARQ transmission is to be re-transmitted.

2. The method of claim 1, further comprising:
    exiting the low power state to decode a third message indicating whether or not the HARQ transmission is to be re-transmitted.

3. The method of claim 2, wherein exiting the low power state to decode a third message includes exiting the low power state to decode a third message during a next transmission by the UE to the base station on the PUSCH.

4. The method of claim 2, wherein:
    the low power state is maintained, prior to exiting, without attempting to decode an integer number of n messages indicating whether or not the HARQ transmission is to be re-transmitted.

5. The method of claim 4, further comprising:
receiving an indication of the integer number n.

6. The method of claim 4, wherein the integer number n is dependent on a type of data transmitted in the HARQ transmission.

7. The method of claim 1, further comprising receiving an indication that the first message corresponds to a suspend acknowledgement message transmitted to suspend re-transmission of the HARQ transmission even if the HARQ transmission was not successfully received.

8. The method of claim 1, wherein a duration for which the low power state is maintained is dependent on how often messages indicating a HARQ transmission is not to be re-transmitted do not correspond to successfully received HARQ transmissions.

9. The method of claim 8, further comprising:
determining a message indicating a HARQ transmission is not to be re-transmitted does not correspond to a successfully received HARQ transmission if such a message is followed by a subsequent message indicating the HARQ transmission is to be re-transmitted.

10. The method of claim 1, wherein maintaining the low power state for a scheduled transmission time of at least a second message indicating whether or not the HARQ transmission is to be re-transmitted includes maintaining the low power state for 15 ms.

11. The method of claim 1, wherein the transmission includes a low duty cycle traffic application.

12. The method of claim 1, wherein maintaining the low power state for a scheduled transmission time of at least a second message indicating whether or not the HARQ transmission is to be re-transmitted includes maintaining the low power state for all scheduled transmission times of messages indicating whether or not the HARQ transmission is to be re-transmitted.

13. An apparatus for wireless communications by a user equipment (UE), comprising:
means for sending a Hybrid Automatic Repeat reQuest (HARQ) transmission to a base station on a physical uplink shared channel (PUSCH);
means for receiving a first message indicating the HARQ transmission is not to be re-ransmitted;
means for entering a low power state in which the UE does not attempt to decode an acknowledgement channel; and
means for maintaining the low power state for a scheduled transmission time of at least a second message indicating whether or not the HARQ transmission is to be re-transmitted.

14. The apparatus of claim 13, further comprising:
means for exiting the low power state to decode a third message indicating whether or not the HARQ transmission is to be re-transmitted.

15. The apparatus of claim 14, wherein the means for exiting the low power state to decode a third message includes means for exiting the low power state to decode a third message during a next transmission by the UE to the base station on the PUSCH.

16. The apparatus of claim 14, wherein:
the low power state is maintained, prior to exiting, without attempting to decode an integer number of n messages indicating whether or not the HARQ transmission is to be re-transmitted.

17. The apparatus of claim 16, further comprising:
means for receiving an indication of the integer number n.

18. The apparatus of claim 16, wherein the integer number n is dependent on a type of data transmitted in the HARQ transmission.

19. The apparatus of claim 13, further comprising means for receiving an indication that the first message corresponds to a suspend acknowledgement message transmitted to suspend re-transmission of the HARQ transmission even if the HARQ transmission was not successfully received.

20. The apparatus of claim 13, wherein a duration for which the low power state is maintained is dependent on how often messages indicating a HARQ transmission is not to be re-transmitted do not correspond to successfully received HARQ transmissions.

21. The apparatus of claim 20, further comprising:
means for determining a message indicating a HARQ transmission is not to be re-transmitted does not correspond to a successfully received HARQ transmission if such a message is followed by a subsequent message indicating the HARQ transmission is to be re-transmitted.

22. The apparatus of claim 13, wherein the means for maintaining the low power state for a scheduled transmission time of at least a second message indicating whether or not the HARQ transmission is to be re-transmitted includes means for maintaining the low power state for 15 ms.

23. The apparatus of claim 13, wherein the transmission includes a low duty cycle traffic application.

24. The apparatus of claim 13, wherein the means for maintaining the low power state for a scheduled transmission time of at least a second message indicating whether or not the HARQ transmission is to be re-transmitted includes means for maintaining the low power state for all scheduled transmission times of messages indicating whether or not the HARQ transmission is to be re-transmitted.

25. An apparatus for wireless communications by a user equipment (UE), comprising:
at least one processor configured to send a Hybrid Automatic Repeat reQuest (HARQ) transmission to a base station on a physical uplink shared channel (PUSCH), receive a first message indicating the HARQ transmission is not to be re-transmitted, enter a low power state in which the UE does not attempt to decode an acknowledgement channel, and maintain the low power state for a scheduled transmission time of at least a second message indicating whether or not the HARQ transmission is to be re-transmitted; and
a memory coupled with the at least one processor.

26. The apparatus of claim 25, wherein the at least one processor is further configured to:
maintain the low power state, prior to exiting, without attempting to decode an integer number of n messages indicating whether or not the HARQ transmission is to be re-transmitted.

27. The apparatus of claim 25, wherein the at least one processor is further configured to maintain the low power state for all scheduled transmission times of messages indicating whether or not the HARQ transmission is to be re-transmitted.

28. A computer program product comprising a non-transitory computer readable medium having instructions stored thereon, the instructions executable by one or more processors for:
sending a Hybrid Automatic Repeat reQuest (HARQ) transmission to a base station on a physical uplink shared channel (PUSCH);
receiving a first message indicating the HARQ transmission is not to be re-transmitted;
entering a low power state in which the UE does not attempt to decode an acknowledgement channel; and maintaining the low power state for a scheduled transmission time of at least a second message indicating whether or not the HARQ transmission is to be re-transmitted.

29. The computer program product of claim 28, further comprising instructions executable by one or more processors for maintaining the low power state, prior to exiting, without attempting to decode an integer number of n messages indicating whether or not the HARQ transmission is to be re-transmitted.

30. The computer program product of claim 28, further comprising instructions executable by one or more processors for maintaining the low power state for all scheduled transmission times of messages indicating whether or not the HARQ transmission is to be re-transmitted.

* * * * *